United States Patent
Korhonen et al.

(10) Patent No.: US 10,177,679 B2
(45) Date of Patent: Jan. 8, 2019

(54) MULTILEVEL INVERTER

(71) Applicant: VACON OY, Vaasa (FI)

(72) Inventors: Juhamatti Korhonen, Lappeenranta (FI); William Giewont, Boiling Springs, PA (US)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 15/466,924

(22) Filed: Mar. 23, 2017

(65) Prior Publication Data

US 2018/0278175 A1  Sep. 27, 2018

(51) Int. Cl.

| | |
|---|---|
| *H02M 7/5387* | (2007.01) |
| *H02M 7/483* | (2007.01) |
| *H02M 7/217* | (2006.01) |
| *H02M 1/088* | (2006.01) |
| H02M 1/00 | (2006.01) |
| H02P 27/08 | (2006.01) |

(52) U.S. Cl.
CPC .......... *H02M 7/217* (2013.01); *H02M 1/088* (2013.01); *H02M 2001/0009* (2013.01); *H02P 27/08* (2013.01)

(58) Field of Classification Search
CPC ...... H02M 7/48; H02M 7/4811; H02M 7/483; H02M 7/4835; H02M 7/4837; H02M 7/49; H02M 7/497; H02M 7/201; H02M 7/53; H02M 7/5387
See application file for complete search history.

(56) References Cited

U.S. PATENT DOCUMENTS

| | | | | |
|---|---|---|---|---|
| 7,206,211 | B2* | 4/2007 | Blidberg ............... | H02M 7/487 363/132 |
| 9,225,262 | B2* | 12/2015 | Aaltio .................. | H02M 1/32 |
| 2014/0376287 | A1* | 12/2014 | Narimani ............. | H02M 3/07 363/60 |
| 2016/0149507 | A1* | 5/2016 | Lei ...................... | H02M 7/487 363/35 |
| 2017/0012554 | A1* | 1/2017 | Pu ....................... | H02M 7/06 |
| 2017/0054298 | A1* | 2/2017 | Fu ........................ | H02M 7/487 |
| 2017/0194877 | A1* | 7/2017 | Kadam ................. | H02M 7/487 |

FOREIGN PATENT DOCUMENTS

| | | |
|---|---|---|
| BR | 102014011275 A2 | 6/2015 |
| BR | 102015000684 A2 | 9/2015 |
| CN | 104270025 A | 1/2015 |

* cited by examiner

*Primary Examiner* — Gary L Laxton
(74) *Attorney, Agent, or Firm* — McCormick, Paulding & Huber LLP

(57) ABSTRACT

An inverter circuit, coupled to a two-level DC voltage supply and being able to form a five-level output voltage is described, together with a method for operating the inverter circuit. The inverter circuit comprises a series connection of six unidirectional power semiconductor switches, each coupled to an antiparallel diode, between the positive and negative nodes of the supplying DC voltage. The inverter circuit further comprises a series connection of two internal capacitors between the cathodes of the first and the fifth switches of the series connection, the connection point of the capacitors being coupled to the internal node of the inverter circuit. In use, the unidirectional power semiconductor switches are controlled in order to set the voltage of the output of the inverter circuit.

20 Claims, 3 Drawing Sheets

MULTILEVEL INVERTER

TECHNICAL FIELD

The present invention relates to multi-level inverters, such as multi-level inverters capable of producing five voltage levels.

BACKGROUND

Inverters are widely used in power electronics applications in conversion between direct current (DC) power and alternating current (AC) power. The most common inverter type, PWM-inverter, converts a DC voltage into an AC output voltage, which consists of pulses with varying widths. The method by which the output voltage is formed is called pulse width modulation (PWM), and the objective in the output voltage forming is normally to create a pulse pattern with a desired fundamental component and minimum content of disadvantageous harmonics.

At low voltage (e.g. grid voltage less than 1 kV) the most common inverter type is a two-level inverter, by which the output voltage can have only values of the positive pole or of the negative pole of the supplying DC voltage. At higher grid voltages, multilevel inverters are often used, due to e.g. the voltage withstand limitations of commercial power components and better waveform of the created output voltage.

Medium grid voltage level (e.g. grid voltage more than 1 kV) is often used in industrial applications. At this voltage level, inverters capable to create output voltages with 3 to 5 level steps are sometimes provided, in part because the inverter power stage is still possible to realize by using commercially available IGBT (insulated gate bipolar transistor) components. A number of known topologies exist for the purpose, e.g. NPC (neutral point clamped), MMC (modular multilevel converter) and CHB (cascaded H-bridge), to name a few.

Drawbacks of the known topologies are e.g. high voltage steps, especially by NPC having a 3-level output voltage, which tend to cause harmful overvoltage spikes at the motor end of a long cable, thus reducing the lifetime of winding insulations. By some topologies the voltage withstand capability of power components limits the usability. Further, by MMC and CHB the component number and complexity of the control arrangement may cause a disadvantage from the system cost point of view.

SUMMARY

An objective of the present invention is to provide a novel inverter circuit, which is able to produce a 5-level output voltage waveform. Solutions according to the invention are advantageous over prior art e.g. in that the power component count is low and in that most power components in the circuit experience voltage stress of only about ¼ of the supplying DC link voltage level. The following is a brief summary in order to provide basic understanding of some aspects of various embodiments of the invention, a more detailed description of exemplifying embodiments are given later. The objective of the invention is achieved by what is stated in the independent claims, other preferred embodiments are disclosed in the dependent claims.

According to the invention, the inverter circuit is coupled to external power circuits via four power nodes of which the first node is coupled to a positive, the second node to a negative and the third node to a mid-point of a supplying DC link voltage, and the fourth node is an output node coupled to a load.

The inverter circuit comprises a series connection of six unidirectional power semiconductor switches (referred to below simply as switches), each having an anode and a cathode, and each coupled to an antiparallel diode. The anodes of the second to sixth switches are coupled to the cathodes of the first to fifth switches in the series connection, respectively. The anode of the first switch is coupled to the first power node, the cathode of the sixth switch is coupled to the second power node and the cathode of the third switch is coupled to the output node. The inverter circuit further comprises a bidirectional power semiconductor circuit, coupled between the third power node and an internal node. The inverter circuit further comprises a series connection of two internal capacitors between the cathodes of the first and the fifth switches of the series connection, the connection point of the capacitors coupled to the internal node of the inverter circuit. The inverter circuit further comprises a series connection of two internal diodes in forward direction from the cathode of the fourth switch to the cathode of the second switch of the series connection, the connection point of the diodes coupled to the internal node of the inverter circuit.

The bidirectional power semiconductor circuit of the invented inverter circuit typically comprises either two oppositely series-coupled unidirectional power semiconductor switches, each coupled to an antiparallel diode, or two oppositely parallel-connected unidirectional reverse blocking power semiconductor switches.

An inverter system according to the present invention comprises an inverter circuit as described above, a control unit being able to control the operation of all unidirectional power semiconductor switches of the inverter circuit, and a sensor being able to measure the output current and to send this information to the control unit.

According to the invention, the unidirectional power semiconductor switches may be controlled such that the output current flows via an internal capacitor, keeping its voltage within predefined permissible limit values around a setpoint value. In some forms of the invention, the setpoint value is ¼ of the supplying DC link voltage, which makes it possible to control the voltage between the output node and the third power node such that it has essentially five different values.

In an embodiment of the present invention, the inverter system comprises a plurality of inverter circuits as described above, under a common control unit to form a multiphase output voltage. Advantageously these kind of multiphase inverters may be used e.g. in frequency converters to form a three-phase voltage for controlling a motor load or to form a three-phase voltage in an active front end converter.

In an apparatus according to the present invention, wherein the control unit is based on a digital logic circuit with a downloadable software, e.g. a microprocessor, the present invention comprises also a new computer program, i.e. a software package, which can be downloaded to a memory device. The computer program comprises computer executable instructions for implementing the above methods for controlling the operation of the unidirectional power semiconductor switches of the inverter circuit.

The present invention comprises also a new computer program product, comprising a non-volatile computer readable medium, e.g. a compact disc "CD", encoded with a computer program for controlling the operation of the unidirectional power semiconductor switches of the inverter circuit.

The present invention comprises also a power electronic converter, e.g. a frequency converter, comprising at least three inverter circuits according to the present invention for creating a three-phase AC voltage to the output, to the input or to both external power connections of the power electronic converter.

BRIEF DESCRIPTION OF THE DRAWINGS

Below the invention appears a more detailed explanation using examples with references to the enclosed figures, wherein FIG. 2 shows a unidirectional power semiconductor switch with an antiparallel diode.

DETAILED DESCRIPTION

Figure 1:
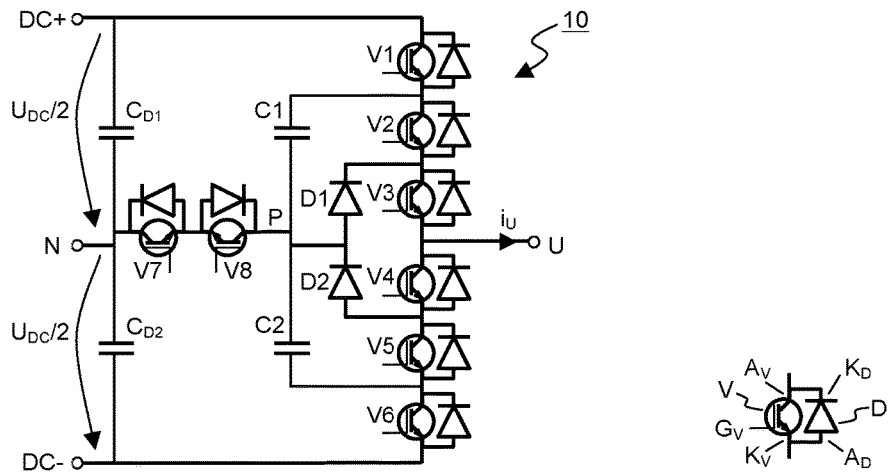
FIG. 1 shows an inverter circuit according to the present invention.

FIG. 1 presents a schematic illustration of an inverter circuit 10 according to the present invention. It is to be noted that the figure is simplified to focus on elements that are relevant for a clear understanding of the invention, while eliminating, for purposes of clarity, other elements, like identification markings of some components, control arrangements of controllable components etc., which are evident for those of ordinary skill in the art.

The inverter circuit is coupled to an external two-level DC voltage link having two essentially equal voltage levels $U_{DC}/2$, by three power nodes DC+, N and DC−. DC+ node is coupled to a positive, DC− node to a negative and N node to a mid-point of the DC link voltage. The output node U of the inverter circuit is coupled to a load. The DC voltage across the nodes DC+ and DC− may be provided by rectifying an AC input, in a manner well known in the art.

The inverter circuit comprises a series connection of six power semiconductor switches $V_1 \ldots V_6$ (referred to below simply as switches), each having an anode and a cathode. Because the relevant switches for this application usually can conduct current in one direction only, from anode to cathode, each switch is coupled to an antiparallel diode. The anodes of the second to sixth switches are coupled to the cathodes of the first to fifth switches in the series connection, respectively. The anode of the first switch is coupled to the first power node DC+, the cathode of the sixth switch is coupled to the second power node DC− and the cathode of the third switch is coupled to the output node U.

The inverter circuit further comprises a bidirectional power semiconductor circuit between the third power node N and an internal node P, the circuit comprising in the implementation example of FIG. 1 two similar switches $V_7$, $V_8$, as $V_1 \ldots V_6$ above, coupled oppositely in series and each switch coupled to an antiparallel diode.

The inverter circuit further comprises a series connection of two internal capacitors $C_1$, $C_2$, coupled between the cathodes of the first ($V_1$) and the fifth ($V_5$) switches of the series connection, the connection point of the capacitors being coupled to the internal node P of the inverter circuit.

The inverter circuit further comprises a series connection of two internal diodes $D_1$, $D_2$, in forward direction from the cathode of the fourth switch ($V_4$) to the cathode of the second switch ($V_2$) of the series connection, the connection point of the diodes being coupled to the internal node P of the inverter circuit.

FIG. 2 presents a power semiconductor switch V, coupled to an antiparallel diode, as presented in FIG. 1, in detail. The switch V has two power terminals, an anode $A_V$ and a cathode $K_V$, and a control terminal gate $G_V$. The switch V may advantageously be an IGBT (insulated gate bipolar transistor), which is able to conduct current only in direction from anode to cathode. In order to prevent harmful effects of a negative voltage, a diode D is antiparallel-coupled to the switch V. The diode is able to conduct current in forward direction only, i.e. from an anode terminal $A_D$ to a cathode terminal $K_D$.

Figure 3A:
FIGS. 3A and 3B show bidirectional power semiconductor circuits.
Figure 3B:
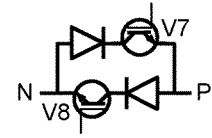

FIGS. 3A and 3B present alternative implementation examples for the bidirectional power semiconductor circuit as presented in FIG. 1. FIG. 3A comprises the same components as presented in FIG. 1, but here the order of switches $V_7$, $V_8$, each coupled to an antiparallel diode, are reversed. In FIG. 3B each switch $V_7$, $V_8$, are coupled in series with a diode, and these unidirectional reverse blocking power semiconductor switches are coupled oppositely in parallel. Devices with integral reverse blocking characteristics can also be used in FIG. 3B configuration, in which case separate serial diodes are unnecessary.

The key operational feature, which is the same by all presented variations of the bidirectional power semiconductor circuit, is that when the switch $V_7$ is turned on, a current can flow from node N to node P but not the other way round. And when the switch $V_8$ is turned on, the current can flow from node P to node N but not vice versa. If both V7 and V8 are turned on, the current can flow in both directions.

Figure 4:
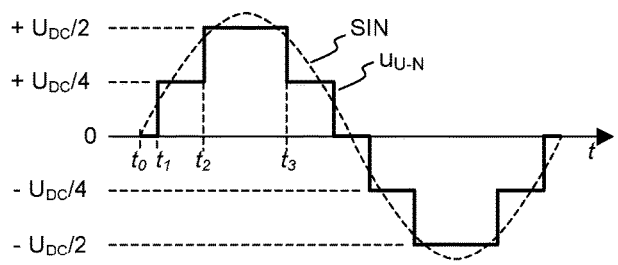
FIG. 4 shows an output voltage of a 5-level inverter circuit.

FIG. 4 illustrates an example of an output voltage waveform $u_{U-N}$, i.e. the voltage between the output node U and the power node N, of an inverter circuit of FIG. 1. The voltage value can change stepwise between values $+U_{DC}/2$, $+U_{DC}/4$, 0, $-U_{DC}/4$ and $-U_{DC}/2$. For clarity the illustrated waveform is simplified, in practice each voltage step may comprise of a number of pulses with width modulation. E.g. during time period from $t_1$ to $t_2$ the output voltage may change several times between 0 and $+U_{DC}/4$, and during time period from $t_2$ to $t_3$ it may alternate between $+U_{DC}/4$ and $+U_{DC}/2$. A general target of the inverter output voltage is normally to follow the form of a fundamental sinewave SIN.

Figure 5:
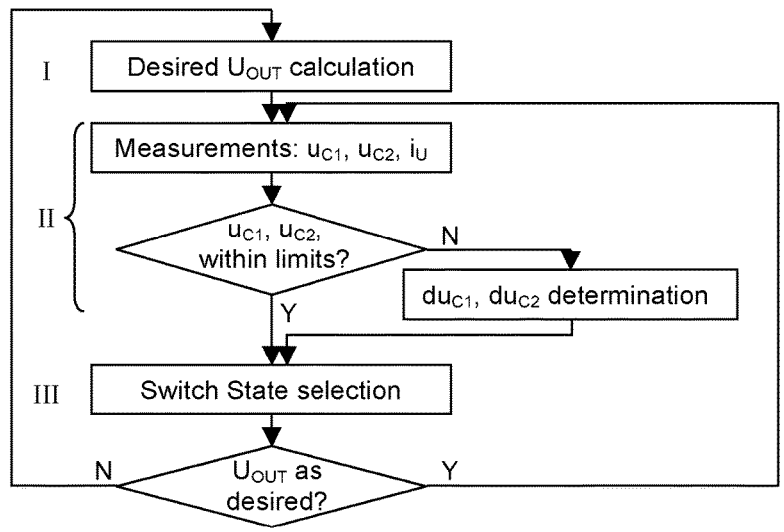
FIG. 5 shows a flowchart for switch state determination.

The output voltage of the inverter circuit of FIG. 1 is determined by the control of unidirectional power semiconductor switches V1 . . . V8. A general flowchart of the switch control logic is presented in FIG. 5 and a more detailed illustration in FIG. 6.

In the first phase I of the switch control, the desired output voltage is determined. This is normally made by a so-called modulator function in a control unit, and the determination may be based on e.g. the output current control of a three-phase inverter arrangement. The output voltage can have five different values $+U_{DC}/2$, $+U_{DC}/4$, 0, $-U_{DC}/4$ and $-U_{DC}/2$.

Figure 6:
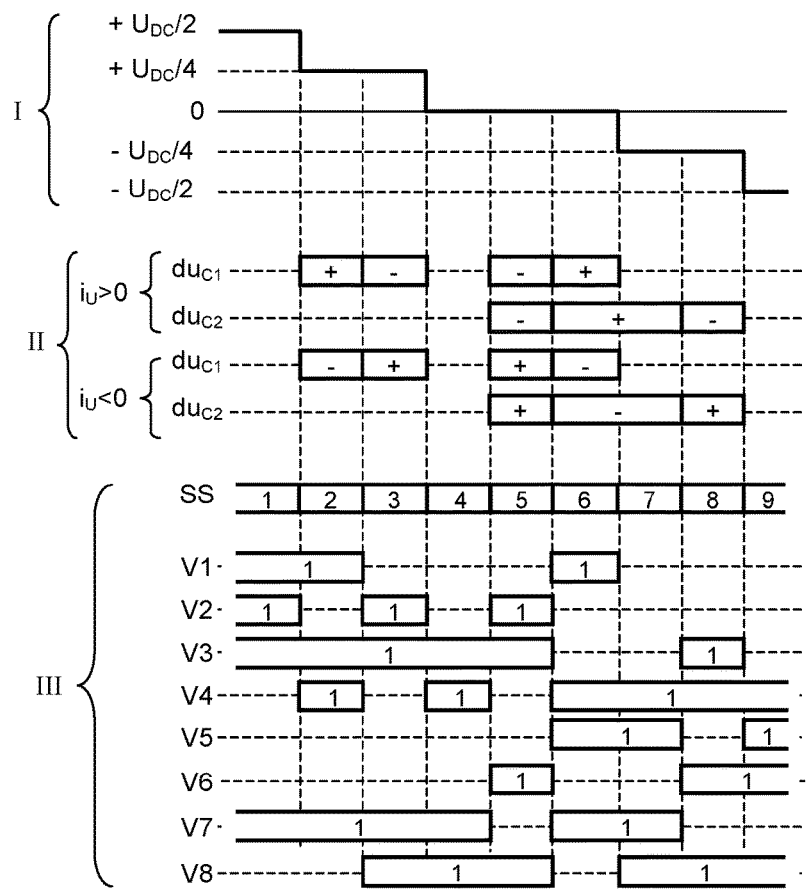
FIG. 6 shows determination of switch states.

In certain operating states the output current flows via the internal capacitors $C_1$, $C_2$, charging or discharging them in accordance with the current direction. In the second phase II of the switch control, the capacitor voltages $u_{C1}$, $u_{C2}$, and the output current $i_U$ direction are measured, and on basis of these measurements the need for charging/discharging the capacitors are determined. In FIG. 6 the dependences of capacitor voltage change directions ($du_{C1}$, $du_{C2}$) as a function of the output current direction (positive $i_U>0$ or negative $i_U<0$) and of the switching states are marked by + sign (capacitor voltage is increasing) and by − sign (decreasing voltage). The target value for the voltage of both capacitors is $U_{DC}/4$, but in practice a small tolerance ΔU around this value is necessary. Thus, e.g. charging of the capacitor is necessary if its voltage is less than $U_{DC}/4-\Delta U$, and discharging if the voltage is higher than $U_{DC}/4+\Delta U$.

In the third phase III of the switch control it will be determined which switches need to be turned on for having the desired output voltage and for changing the voltages of internal capacitors according to the need. The inverter circuit according to the invention allows nine different switching states SS for the purpose, as illustrated in FIG. 6. Description of inverter circuit operation in each switching state is given below:

In the switching state 1 (SS1) the switches $V_1$, $V_2$, $V_3$ and $V_7$ are turned on (marked as 1 in the diagram of FIG. 6), thus the output node U is coupled to the input node DC+ and the output voltage is $+U_{DC}/2$ regardless of the output current direction. The on-state of $V_7$ has no effect to the output voltage, it just ensures a smooth transition to SS2 or SS3 when necessary.

In SS2 the switches $V_1$, $V_3$, $V_4$ and $V_7$ are turned on. A positive load current flows from DC+ via $V_1$, $C_1$, $D_1$ and $V_3$ to the output node U, thus charging the capacitor $C_1$. A negative output current flows from U via $V_4$, $D_2$, $C_1$ and $V_1$ to DC+, thus discharging the capacitor $C_1$. Regardless of the output current direction the output voltage is $+U_{DC}/4$ (voltage of DC+ node minus the voltage of capacitor $C_1$). The on-state of $V_7$ has no effect to the output voltage, it just ensures a smooth transition to SS3 when necessary.

In SS3 the switches $V_2$, $V_3$, $V_7$ and $V_8$ are turned on. A positive load current flows from N via $V_7$, the antiparallel diode of $V_8$, $C_1$, $V_2$ and $V_3$ to U, thus discharging C1. A negative load current flows from U via the antiparallel diodes of $V_3$ and $V_2$, $C_1$, $V_8$ and the antiparallel diode of $V_7$ to U, thus charging C1. Regardless of the output current direction the output voltage is $+U_{DC}/4$ ($C_1$ voltage).

In SS4 the switches $V_3$, $V_4$, $V_7$ and $V_8$ are turned on, thus regardless of the output current direction there is always a direct current path between the DC-link mid-point node N and the output node U, thus the output voltage is 0. Capacitor voltages remain unchanged.

In SS5 the switches $V_2$, $V_3$, $V_6$ and $V_8$ are turned on. A positive load current flows from DC− via the antiparallel diode of $V_6$, $C_2$, $C_1$, $V_2$ and $V_3$ to U, thus discharging both capacitors. A negative load current flows from U via the antiparallel diodes of $V_2$ and $V_3$, $C_1$, $C_2$ and $V_6$ to UDC−, thus charging both capacitors. The output voltage is 0 (voltages of both capacitors added to the DC− voltage).

In SS6 the switches $V_1$, $V_4$, $V_5$ and $V_7$ are turned on. A positive load current flows from DC+ via $V_1$, $C_1$, $C_2$, $V_2$ and antiparallel diodes of $V_5$ and $V_4$ to U, thus charging both capacitors. A negative load current flows from U via $V_4$, $V_5$, $C_2$, $C_1$ and the antiparallel diode of $V_1$ to UDC+, thus discharging both capacitors. The output voltage is 0 (DC+ voltage minus voltages of both capacitors).

In SS7 the switches $V_4$, $V_5$, $V_7$ and $V_8$ are turned on. A positive load current flows from N via $V_7$, the antiparallel diode of $V_8$, $C_2$ and antiparallel diodes of $V_5$ and $V_4$ to the output node U, thus charging the capacitor $C_2$. A negative output current flows from U via $V_4$, $V_5$, $C_2$, $V_8$ and the antiparallel diode of $V_7$ to N, thus discharging the capacitor $C_2$. Regardless of the output current direction the output voltage is $-U_{DC}/4$ (voltage of N node minus the voltage of capacitor $C_2$).

In SS8 the switches $V_3$, $V_4$, $V_6$ and $V_8$ are turned on. A positive load current flows from DC− via the antiparallel diode of $V_6$, $C_2$, $D_1$ and $V_3$ to the output node U, thus discharging the capacitor $C_2$. A negative output current flows from U via $V_4$, $D_2$, $C_2$ and $V_6$ to DC−, thus charging the capacitor $C_2$. Regardless of the output current direction the output voltage is $-U_{DC}/4$ (voltage of DC− node plus the voltage of capacitor $C_2$). The on-state of $V_8$ has no effect to the output voltage, it just ensures a smooth transition to SS7 when necessary.

In SS9 the switches $V_4$, $V_5$, $V_6$ and $V_8$ are turned on, thus the output node U is coupled to the input node DC− and the output voltage is $-U_{DC}/2$ regardless of the output current direction. The on-state of $V_8$ has no effect to the output voltage, it just ensures a smooth transition to SS7 or SS8 when necessary.

By way of example, consider the scenario in which the desired output voltage is $+U_{DC}/4$ and the output current $i_U$ is positive. In this scenario, if the capacitor C1 needs to be charged, then FIG. 6 shows that the appropriate switching state to select is SS2. Conversely, if the capacitor C1 needs to be discharged, then FIG. 6 shows that the appropriate switching state to select is SS3.

Similar determinations can be made for other circumstances. For example, consider the scenario in which the desired output voltage is 0 and the output current $i_u$ is negative. In this scenario, if both the capacitors C1 and C2 need to be charged, then the appropriate switching state to select is SS5, if both of the capacitors C1 and C2 need to be discharged, then the appropriate switching state to select is SS6 and if neither capacitor is to be charged or discharged, then the appropriate switching state is SS4.

Figure 7:
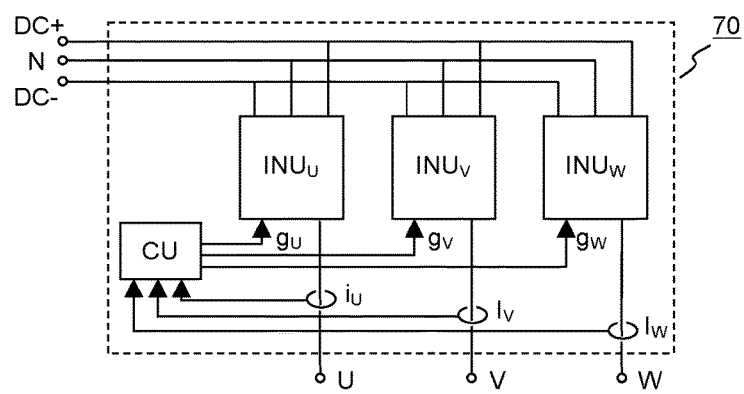
FIG. 7 shows a 3-phase inverter circuit according to the present invention.

FIG. 7 presents a schematic illustration of a three-phase inverter system 70 according to the present invention, comprising of three single-phase inverter circuits $INU_U$, $INU_V$, $INU_W$, coupled to a common two-level DC voltage source DC+, N, DC−, in accordance to the present invention as described above. In this example the control unit CU is common for all inverters, receiving output current information $i_U$, $i_V$, $i_W$, from all output phase-specific current sensors. CU performs the measures required by the control of the load (not presented) coupled to the output nodes U, V, W, and sends the control signals $g_U$, $g_V$, $g_W$, to the single-phase inverters in order to set the required phase-specific switching states.

FIG. 7 provides one example of a three-phase inverter system. Many alternative arrangements exist. For example, a separate control unit could be provided for each of the single-phase inverter circuits. Of course, other systems can be provided with more of fewer than three phases.

Figure 8:
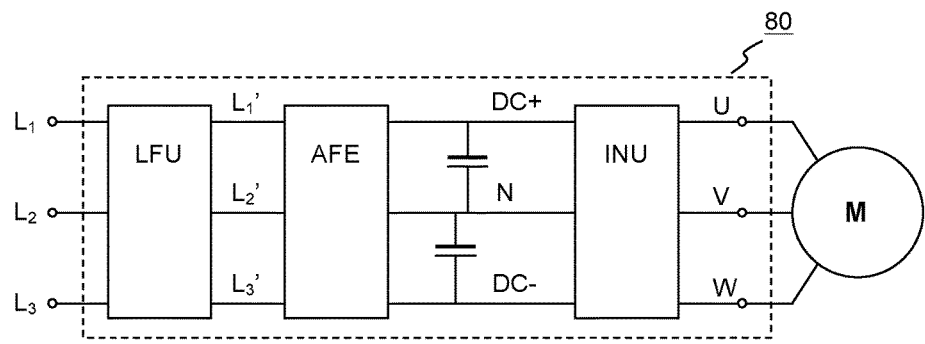
FIG. 8 shows a regenerative frequency converter.

FIG. 8 presents an example of known applications wherein three-phase inverters as presented in FIG. 7 may be used. Here the first inverter, INU, is used to supply a variable frequency/variable voltage to a motor M. The other inverter, AFE, is used as a so-called active front end converter, between the intermediate DC link having nodes DC+, N and DC−, and a filter unit LFU via which AFE is coupled to the grid having phases $L_1$, $L_2$, $L_3$. Of course, although single phase and three-phase inverter arrangements are described here, the principles of the invention are applicable to inverter systems having any number of phases. Other variants on the arrangement of FIG. 8 will be readily apparent to those skilled in the art; for example, a rectifier circuit could be provided instead of the AFE shown in FIG. 8.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An inverter circuit having a first power node coupled to a positive of a supplying DC link voltage, a second power node coupled to a negative of the supplying DC link voltage, a third power node coupled to a mid-point between the positive of the supplying DC link voltage and the negative of the supplying DC link voltage, and an output node, the inverter circuit comprising:
    a first series connection of six unidirectional power semiconductor switches, each having an anode and a cathode, and each coupled to an antiparallel diode, wherein the anode of the first unidirectional power semiconductor switch is coupled to the first power node, the cathode of the sixth unidirectional power semiconductor switch is coupled to the second power node and the anodes of the second to sixth unidirectional power semiconductor switches are coupled to the cathodes of the first to fifth unidirectional power semiconductor switches in the first series connection respectively, wherein the cathode of the third unidirectional power semiconductor switch is coupled to the output node of the inverter circuit;
    a bidirectional power semiconductor circuit, coupled between the third power node of the inverter circuit and an internal node of the inverter circuit;
    a second series connection of two internal capacitors, coupled between the cathodes of the first and the fifth unidirectional power semiconductor switches of the series connection, and midpoint of the series connected capacitors is connected to the internal node of the inverter circuit;
    a third series connection of two internal diodes, coupled in forward direction from the cathode of the fourth to the cathode of the second unidirectional power semiconductor switch of the first series connection, a connection point of the two internal diodes being coupled to the internal node of the inverter circuit.

2. The inverter circuit as claimed in claim 1, wherein the bidirectional power semiconductor circuit comprise two oppositely series-coupled unidirectional power semiconductor switches with antiparallel diodes.

3. The inverter circuit as claimed in claim 1, wherein the bidirectional power semiconductor circuit comprise two oppositely parallel-connected unidirectional reverse blocking power semiconductor switches.

4. The inverter circuit as claimed in claim 1, wherein the unidirectional power semiconductor switches are controlled such that the output current of the inverter circuit flows via the internal capacitors of the inverter circuit.

5. The inverter circuit as claimed in claim 1, wherein the unidirectional power semiconductor switches are controlled such that a voltage of the internal capacitors stay within predefined permissible limit values around a setpoint value.

6. The inverter circuit, as claimed in claim 5, wherein the setpoint value for the internal capacitor voltage is ¼ of the supplying DC link voltage.

7. The inverter circuit, as claimed in claim 1, wherein the unidirectional power semiconductor switches are controlled such that a voltage between the output node and the third power node of the inverter circuit can be set to one of five different values.

8. An inverter system comprising the inverter circuit as claimed in claim 1, and further comprising a sensor for measuring an inverter output current, and a control unit, wherein the control unit is able to control all unidirectional power semiconductor switches of the inverter circuit and to use the measured output current value in a control function of the control unit.

9. An inverter system comprising a plurality of inverter circuits, wherein each of the plurality of inverter circuits is the inverter circuit as claimed in claim 1, each inverter comprising a sensor for measuring an inverter output current, and a control unit, wherein the control unit is able to control all unidirectional power semiconductor switches of all inverter circuits and to use the measured output current values in a control function of the control unit.

10. A method of controlling an inverter circuit,
    wherein the inverter circuit comprises a first power node coupled to a positive DC link voltage value, a second power node coupled to a negative DC link voltage value, a third power node coupled to a mid-point between the positive and negative DC link voltage values, and an output node,
    wherein the inverter circuit further comprises a first series connection of six unidirectional power semiconductor switches, each having an anode and a cathode, and each coupled to an antiparallel diode, wherein the anode of the first unidirectional power semiconductor switch is coupled to the first power node, the cathode of the sixth unidirectional power semiconductor switch is coupled to the second power node and the anodes of the second to sixth unidirectional power semiconductor switches are coupled to the cathodes of the first to fifth unidirectional power semiconductor switches in the first series connection respectively, wherein the cathode of the third unidirectional power semiconductor switch is coupled to the output node of the inverter circuit,
    wherein the inverter circuit further comprises a second series connection of two internal capacitors, coupled between the cathodes of the first and the fifth unidirectional power semiconductor switches of the first series connection,
    wherein the inverter circuit further comprises a third series connection of two internal diodes, coupled in forward direction from the cathode of the fourth to the cathode of the second unidirectional power semiconductor switch of the first series connection, a connection point of the two internal diodes being coupled to the internal node of the inverter circuit,
    the method comprising controlling the unidirectional power semiconductor switches in order to set a voltage between the output node and the third power node of the inverter circuit to one of five different values between the positive and negative DC link voltage values.

11. The method as claimed in claim 10, further comprising controlling the unidirectional power semiconductor switches such that an output current of the inverter circuit flows via at least one of the internal capacitors of the inverter circuit.

12. The method as claimed in claim 11, further comprising controlling the unidirectional power semiconductor switches such that a voltage of the internal capacitors stays within predefined permissible limit values around a setpoint value.

13. The system according to claim 8, wherein the control unit is based on a digital logic circuit with a downloadable software.

14. A computer program, which can be downloaded to a memory device of a control unit, comprising computer executable instructions for implementing the method of claim 10.

15. A computer program product, comprising a non-volatile computer readable medium encoded with the computer program of claim 14.

16. The inverter circuit as claimed in claim 2, wherein the unidirectional power semiconductor switches are controlled such that an output current of the inverter circuit flows via at least one of the internal capacitors of the inverter circuit.

17. The inverter circuit as claimed in claim 3, wherein the unidirectional power semiconductor switches are controlled such that an output current of the inverter circuit flows via at least one of the internal capacitors of the inverter circuit.

18. The inverter circuit as claimed in claim 2, wherein the unidirectional power semiconductor switches are controlled such that a voltage of the internal capacitors stay within predefined permissible limit values around a setpoint value.

19. The inverter circuit as claimed in claim 3, wherein the unidirectional power semiconductor switches are controlled such that a voltage of the internal capacitors stay within predefined permissible limit values around a setpoint value.

20. The inverter circuit as claimed in claim 4, wherein the unidirectional power semiconductor switches are controlled such that a voltage of the internal capacitors stay within predefined permissible limit values around a setpoint value.

* * * * *